(No Model.)

V. C. CARADINE.
APPARATUS FOR WASHING AND DRAINING DISHES.

No. 419,497. Patented Jan. 14, 1890.

Witnesses:
C. B. Randell.
J. D. Hazlip.

Inventor
Virginia C. Caradine

UNITED STATES PATENT OFFICE.

VIRGINIA C. CARADINE, OF SHERMAN, TEXAS.

APPARATUS FOR WASHING AND DRAINING DISHES.

SPECIFICATION forming part of Letters Patent No. 419,497, dated January 14, 1890.

Application filed October 20, 1888. Serial No. 288,723. (No model.)

*To all whom it may concern:*

Be it known that I, VIRGINIA C. CARADINE, a citizen of the United States of America, residing at Sherman, in the county of Grayson and State of Texas, have invented a new and Improved Apparatus in which to Wash and Drain Dishes, Vegetables, &c., of which the following is a specification, reference being had therein to the accompanying drawings.

The object of my invention is the production of an apparatus wherein dishes, vegetables, &c., may be washed and drained without the necessity of putting the hands in the wash-water.

My invention will be first fully described in connection with the accompanying drawings, and then pointed out in the claim.

Figure 1:
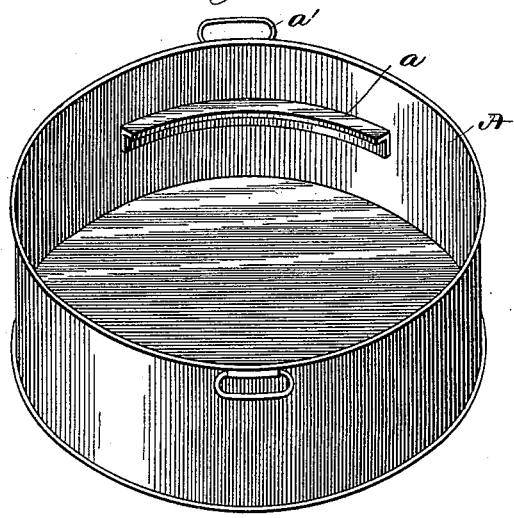
Figure 2:
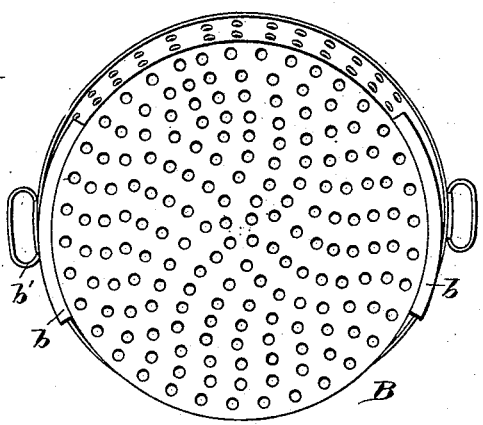
Figure 3:
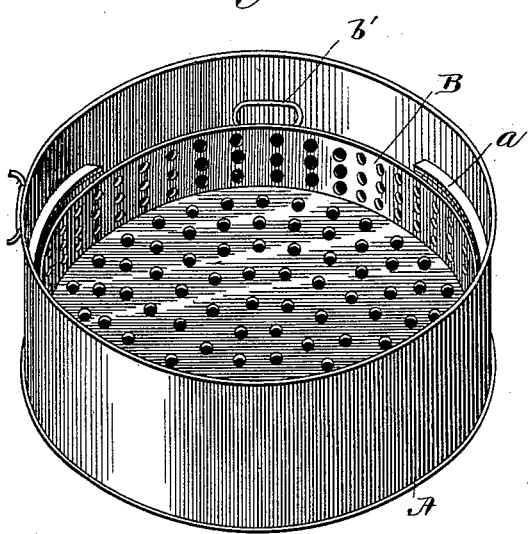
Figure 4:
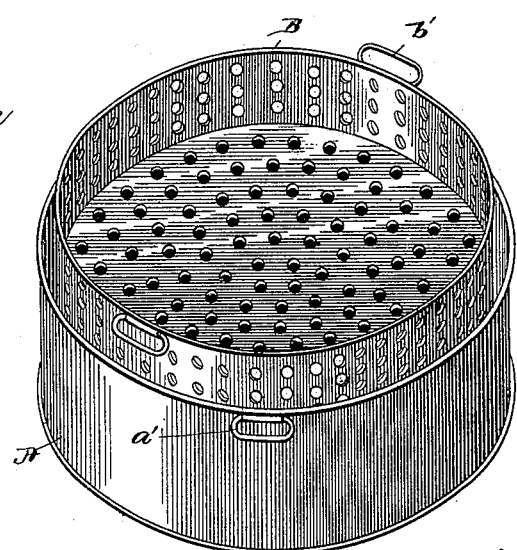

Figure 1 of the drawings is a perspective view of the pan. Fig. 2 is a perspective view of the tray. Fig. 3 is a perspective view showing the tray in its lowered position within the pan. Fig. 4 is a perspective view showing the tray in its raised position within the pan.

A represents a pan made from any suitable material, as tin. Its side portion is perpendicular—that is to say, the pan is of the same diameter at bottom as at top. It is provided on its inner side, about one-third the distance downward from its top and at suitable intervals, with rigidly attached ledges or brackets *a*, for a purpose which will hereinafter appear, and on the outer side at its upper edge it is provided with the usual handles *a'*.

B represents a tray made in the general form of the pan—that is to say, its side portion is perpendicular, but its diameter is somewhat less than that of the pan, and its height is considerably less, preferably about one-half of that of the pan. Its side and bottom portions are perforated, as shown in the drawings, the perforations being small, but as close together as is consistent with the requisite strength of the tray. On the outer side, near the bottom, the tray is provided with brackets *b*, similar to those on the pan, and at its upper edge, on the outer side, it is provided with handles *b'*.

In using my apparatus I place the tray within the pan, resting it upon the bottom of the latter, the brackets *b* passing between the brackets *a*, and then pour in as much hot water as is desired. I then put the dishes into the water in the tray one at a time, (knives, forks, and spoons, however, may all be placed in at one time,) and mop them by any suitable device as I put them in. When a sufficient number of dishes have been washed in this manner, I raise the tray until its brackets are above those on the pan, and then turn the former part way around and rest its brackets on the brackets *a*. I then pour clean boiling water over the dishes to rinse them, the water passing through the perforations in the tray and falling into the pan, which still holds the wash-water. It will be observed that in this manner all the dishes in the tray may be rinsed at once without coming into contact again with the wash-water, which is especially desirable in the event that soap or soda has been used; and, furthermore, the hot rinse-water added to the wash-water keeps the latter warm. After rinsing, the dishes are allowed to remain in the tray until thoroughly drained, which requires but a short time when boiling water is used to rinse them.

The adaptability of the apparatus in washing vegetables, fruits, &c., as well as dishes will be apparent.

By the use of this apparatus one is enabled to wash and drain the articles without the necessity of putting her hands in the water—a very desirable result by reason of the tendency of the wash-water to cause the skin of the hands to get rough and crack open; to keep the wash-water warm by the addition of the hot rinse-water, and to carry on these operations on the table in the space occupied by a single pan.

Having thus described my invention, what I claim as new, and desire to secure by Letters Patent, is—

The combination, with a pan provided near its top on the inner side with rigidly-attached brackets, of a tray in the form of a pan whose side and bottom portions are perforated, as described, the tray being of less diameter and height than the pan and provided on its outer side near the bottom with brackets and on its upper edge with handles, substantially as described, and for the purposes set forth.

VIRGINIA C. CARADINE.

Witnesses:
    E. F. BROWN,
    S. H. WOODS.